United States Patent [19]

Belart et al.

[11] 4,191,210

[45] Mar. 4, 1980

[54] APPARATUS FOR BRAKING SYSTEMS INCORPORATING A PRESSURE-CONTROL DEVICE FOR ANTISKID CONTROL

[75] Inventors: Juan Belart, Walldorf; Dieter Kircher, Frankfurt am Main, both of Fed. Rep. of Germany

[73] Assignee: ITT Industries, Incorporated, New York, N.Y.

[21] Appl. No.: 858,510

[22] Filed: Dec. 8, 1977

[30] Foreign Application Priority Data

Jan. 21, 1977 [DE] Fed. Rep. of Germany ....... 2702399

[51] Int. Cl.² .......................................... F16K 31/12
[52] U.S. Cl. .............................. 137/505.13; 137/513.3; 137/517
[58] Field of Search ................. 137/505.13, 513.3, 517

[56] References Cited

U.S. PATENT DOCUMENTS

| 714,747 | 12/1902 | Rowley | 137/513.3 X |
| 2,824,573 | 2/1958 | Mason | 137/505.13 |
| 2,885,173 | 5/1959 | Dobrick | 137/505.13 X |
| 2,909,188 | 10/1959 | Billington | 137/513.3 X |
| 2,955,614 | 10/1960 | Meynig | 137/505.13 |
| 3,053,273 | 9/1962 | Schreiner | 137/505.13 |
| 3,115,156 | 12/1963 | Mortimer | 137/513.3 |

FOREIGN PATENT DOCUMENTS 2539958  4/1976  Fed. Rep. of Germany ...... 137/505.13

Primary Examiner—Harold W. Weakley
Attorney, Agent, or Firm—John T. O'Halloran; Alfred C. Hill

[57] ABSTRACT

A throttling arrangement for braking systems with antiskid control disposed between the pressure-control device and the wheel braking cylinders. The throttle is so designed that a valve passageway bypassing it remains open until a preset braking pressure is reached. This arrangement ensures rapid brake application in the lower pressure range while at the same time permits a restricted increase of the braking pressure in the upper pressure range independently of the frequency of the antiskid control cycles.

4 Claims, 1 Drawing Figure

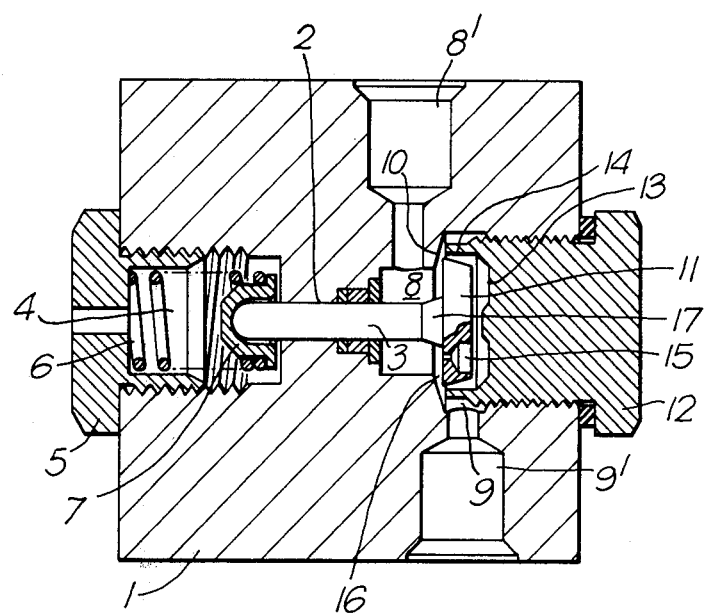

APPARATUS FOR BRAKING SYSTEMS INCORPORATING A PRESSURE-CONTROL DEVICE FOR ANTISKID CONTROL

BACKGROUND OF THE INVENTION

This invention relates to an apparatus for braking systems, incorporating a pressure-control device for anti-skid control, which comprises an inlet port adapted to communicate with the pressure-control device, an outlet port adapted to connect with at least one wheel brake, and a throttle providing for permanent communication between the inlet port and the outlet port. Such an apparatus is already known from German Pat. No. 909,657.

In braking systems incorporating pressure-control devices for antiskid control, the general problem is that the pressure-control device should provide for braking-pressure decrease and increase as rapidly as possible, ensuring on the other hand that the wheel is not immediately brought to a lock again. In the known apparatus, this is achieved by a piston slidably sealed in a cylinder and having a throttle extending therethrough, with a spring bearing on the piston in the direction of the pressure-control device. By the provision of a check valve which is inserted before the cylinder it is ensured that fluid is allowed to flow through the cylinder only in the direction towards the wheel brake. By means of a check valve arranged in parallel with the cylinder, fluid is only allowed to return from the wheel brake to the pressure-control device. In this arrangement, the known apparatus acts in such a manner that the pressure exerted by a braking pressure source is passed to the cylinder through the preceding check valve, thereby displacing the piston in opposition to the spring, which causes braking pressure to build up in the wheel brake. In rapidly succeeding antiskid control cycles, however, the piston bottoms the cylinder and renewed build up of braking pressure is only possible in the degree permitted by the throttle.

If the braking pressure is completely exhausted during an antiskid control cycle, a large amount of pressure fluid will be required initially until pressure builds up in the wheel brake because, for example, the clearance of the wheel brake has to be overcome first and because more pressure fluid is employed as a result of elastic deformations in the lower pressure range. While it is true that, at the commencement of a braking action and during prolonged intervals between the antiskid control cycles as well as prolonged phases of pressure decrease, the known apparatus permits quick supply of pressure fluid to the wheel brake by displacement of the piston, a certain amount of time will nevertheless lapse in the case of rapidly succeeding antiskid control cycles until braking pressure will be build up again if it had dropped to as low as zero value. This is of sufficient disadvantage in itself. But considering further that in the case of braking-pressure decrease to a partial value the subsequent pressure increase will commence immediately, it will be readily seen that this apparatus cannot be satisfactory. It is a further disadvantage therein that the proportion of rapid pressure increase depends on how far the piston happened to have been pushed back by the spring during the respective antiskid control cycle.

SUMMARY OF THE INVENTION

It is the object of the present invention to improve an apparatus of the type initially referred to in such a manner as to achieve a rapid pressure increase up to a constant predetermined braking pressure, followed by a throttled pressure increase, without the frequency of the antiskid control cycles affecting the apparatus.

A feature of the present invention is the provision of apparatus for braking systems incorporating a pressure-control device for antiskid control comprising an inlet port communicating with the pressure-control device, an outlet port connected to at least one wheel brake, and a throttle providing a permanent communication between the inlet port and the outlet port, the apparatus further comprising a valve passageway by-passing the throttle between the inlet port and the outlet port; and a valve member adapted to move in response to pressure to close the passageway upon attainment of a predetermined braking pressure.

There is achieved by this arrangement that, fully independent of the antiskid control cycles, there is always an unthrottled pressure increase up to a predetermined braking pressure so that the wheel brakes are reapplied rapidly even in the case that there has been a braking pressure decrease down to zero value.

In an advantageous embodiment, the valve member consists of a piston and a valve disk, with the piston being slidably sealed in a bore and having a spring bearing on the piston in opposition to the braking pressure, and with the valve passageway being arranged to be closed by the valve disk becoming seated on a valve seat formed in the housing when the valve member is displaced in opposition to the spring. In this embodiment, a pressure drop via the pressure-control device or the braking-pressure source will always result in the valve passageway being opened immediately, because this permits at the same time the function of a one-way valve to be achieved in the event of a pressure drop from the wheel brake to the pressure-control device. Thus, this arrangement allows rapid decrease of the braking pressure at any time.

It is a particular advantage if the valve disk, on its side remote from the valve seat, is surrounded by a cap formed at the housing such that, with the valve passageway open, there is only a gap between the valve disk and the cap and that the inlet port terminates outside the cap into an inlet chamber in front of the valve seat. By this arrangement it is ensured that the valve member is not subjected to forces caused by pressure-fluid flow and, consequently, always closes at precisely the same braking pressure, independent of the speed of the pressure-fluid flow. In addition, owing to the fact that the diameter of the valve disk is conically tapered towards the cap, it is achieved that, as the valve member moves to close, the cross-sectional area of the orifice betwee the valve disk and the cap will increase, thereby allowing pressure fluid to flow easily into the cap which results in a rapid closing movement.

The apparatus becomes particularly compact by arranging the throttle in the valve disk.

BRIEF DESCRIPTION OF THE DRAWING

The above-mentioned and other features and objects of the invention and the manner of obtaining them will become more apparent by reference to the following description taken in conjunction with the drawing, the single FIGURE of which illustrates a longitudinal cross-sectional view of the apparatus constructed in accordance with the principles of this invention.

DESCRIPTION OF THE PREFERRED EMBODIMENT

Housing 1 accommodates a bore 2 in which a piston 3 is slidably sealed. On the left, piston 3 projects into a spring chamber 4 which is closed by a plug 5. Plug 5 has a breather bore so that spring chamber 4 is always in communication with atmosphere. Spring chamber 4 houses a spring 6 bearing with one end against plug 5 and with its other end against piston 3 via a spring plate 7.

On its right, piston 3 projects into a chamber 8 and 9 in which it carries a valve disk 11. Valve disk 11 permits chamber 8 and 9 to be subdivided at a valve seat 10 into an inlet chamber 9 communicating with an inlet port 9' and an outlet chamber 8 communicating with an outlet port 8'. Inlet chamber 9 is closed by a plug 12 whose end closest to valve disk 11 is designed as a cap 13 embracing the valve disk 11. When viewed from the piston 3 in the direction towards the cap 13, valve disk 11 gradually diminishes in diameter. From this there results that a gap 14 is formed between valve disk 11 and cap 13 which is small in the illustrated inoperative position, while gap 14 increases rapidly as the valve disk 11 moves towards the left. Valve disk 11 also incorporates a throttle 15 providing for communication between inlet chamber 9 and outlet chamber 8 even if a valve passageway 16 between valve seat 10 and valve disk 11 is closed, because valve member 17, which consists of piston 3 and valve disk 11, is shifted to the left. It would, of course, also be possible to provide the throttle 15 in the housing 1 between the inlet chamber 9 and the outlet chamber 8 without changing the effect in any way.

For utilization in a braking system incorporating a pressure-control device for antiskid control, the apparatus is arranged in the brake line section between at least one wheel brake and the pressure-control device such that inlet port 9' connects with the pressure-control device and outlet port 8' connects with the wheel brake. From this results the following function:

As pressure increases at inlet port 9', pressure fluid will flow from inlet chamber 9 through valve passageway 16 and outlet chamber 8 to the connected wheel brake, thereby causing an appropriate braking pressure to be built up in the connected wheel brake. By means of gap 14, pressure will also develop between valve disk 11 and cap 13. As a result, valve member 17 is acted upon to the left, in accordance with the cross-sectional area of piston 3, while it is urged to the right into the illustrated position by spring 6. In this process, spring 6 is in a position to maintain valve member 17 in the illustrated position up to a predetermined pressure. If this pressure is exceeded, valve member 17 will move to the left and valve passageway 16 will be closed at valve seat 10 by valve disk 11. During this closing movement, gap 14 between cap 13 and valve disk 11 will become greater, thereby allowing ready flow of pressure fluid into the increasing space between cap 13 and valve disk 11 and permitting a rapid closing movement. It is to be noted that, prior to the closing movement, by virtue of the arrangement of the cap 13, the pressure fluid flow from inlet chamber 9 to outlet chamber 8 could not exert a dynamic force on the valve member 17.

After valve passageway 16 is closed, inlet chamber 9 and outlet chamber 8 only communicate through the throttle 15. In the event of further pressure increase in inlet chamber 9, the flow of pressure fluid to outlet chamber 8 will therefore be throttled so that the braking pressure at the wheel brake is allowed to increase only at a speed determined by the throttle 15, irrespective of the speed at which the pressure increases in inlet chamber 9.

In the event of a rapid pressure drop in inlet chamber 9, the side of valve disk 11 closest to the cap will be pressure-relieved whereas pressure will act upon the side closest to outlet chamber 8. As a result, valve member 17 will be immediately displaced into the illustrated position by hydraulic force and the force provided by spring 6, so that the full cross-sectional area of valve passageway 16 will be available for pressure decrease and the braking pressure at the wheel brake will immediately follow the pressure drop in inlet chamber 9. It is essential in this arrangement that valve member 17, following termination of the pressure decrease down to a partial value, will immediately close valve passageway 16 again if this partial value is above the pressure at which valve passageway 16 becomes closed during a pressure increase. In that case, the speed at which pressure is allowed to increase again is reduced by throttle 15.

In the event of a slow pressure drop, the pressure in outlet chamber 8 is allowed to follow the decreasing pressure in inlet chamber 9 directly through throttle 15. Therefore, valve passageway 16 remains initially closed in that case, until the spring 6 is alone in a position to displace piston 3 to the right into the illustrated position.

Summing up, it results that during pressure increase the valve passageway will remain open until a determined braking pressure is reached, independent of the speed at which the pressure builds up. Subsequent pressure increase is only possible at a speed determined by throttle 15. In the event of pressure decrease, the braking pressure can always be decreased at any speed, and the valve passageway 16 will be opened also at a high braking pressure if throttle 15 would prevent the pressure from being decreased.

While we have described above the principles of our invention in connection with specific apparatus it is to be clearly understood that this description is made only by way of example and not as limitation to the scope of our invention as set forth in the objects thereof and in the accompanying claims.

We claim:

1. Apparatus for braking systems incorporating an antiskid pressure control device comprising:
    a housing having a longitudinal axis;
    a stepped bore disposed coaxial of said axis including
        a first portion having a first given diameter,
        a second portion integral with said first portion having a second given diameter greater than said first given diameter, said second portion providing an outlet chamber, and
        a third portion integral with said second portion having a third given diameter greater than said second given diameter, said third portion providing an inlet chamber;
    a valve seat formed in said bore at the junction of said second and third portions;
    a valve member movable in response to braking pressure including
        a piston coaxial of said axis slidably sealed in said first portion and extending through said second portion, and
        a valve disk coaxial of said axis coupled to said piston adjacent said second portion, said disk being disposed in said third portion in an opening and closing relation with said valve seat and having a tapered periphery the maximum diameter of which is disposed adjacent said valve seat;

a throttle disposed in said housing to provide a permanent communication between said inlet chamber and said outlet chamber; and a valve passageway extending from a first transverse surface of said disk adjacent said valve seat to a second transverse surface of said disk remote from said valve seat including a gap between said tapered periphery of said disk and the inner surface of a hollow cylindrical cap disposed coaxial of said axis and extending over and embracing said tapered periphery of said disk when said disk is in its open position, the outer surface of said cap being spaced from the inner surface of said third portion, said cap extending from an end wall of said third portion remote from said valve seat, the cross-section of said gap increasing due to said tapered periphery of said disk when said disk moves from its open position to its closed position to provide a rapid closing movement for said valve member by pressure fluid flowing through said gap from said first transverse surface to said second transverse surface, said passageway being closed by said disk being seated on said valve seat upon attainment of a predetermined value of braking pressure acting on said disk in opposition to a spring acting on an end of said piston remote from said disk.

2. Apparatus according to claim 1, wherein
said spring is disposed in a spring chamber disposed in said housing coaxial of said axis and integral with said first portion, said spring chamber being in communication with atmosphere.

3. Apparatus according to claim 2, wherein
said throttle is disposed in said disk spaced from and parallel to said axis.

4. Apparatus according to claim 1, wherein said throttle is disposed in said disk spaced from and parallel to said axis.

* * * * *